United States Patent [19]
Soderquist

[11] Patent Number: 5,678,848
[45] Date of Patent: Oct. 21, 1997

[54] AIR BAG MODULE WITH COMBINED ASSEMBLY AND MOUNTING HARDWARE

[75] Inventor: Quin Soderquist, South Weber, Utah

[73] Assignee: Morton International, Inc., Chicago, Ill.

[21] Appl. No.: 587,694

[22] Filed: Jan. 17, 1996

[51] Int. Cl.[6] .................................................. B60R 21/16
[52] U.S. Cl. ................................ 280/728.2; 280/731
[58] Field of Search ......................... 280/728.2, 728.3, 280/731, 732

[56] References Cited

U.S. PATENT DOCUMENTS

| | | | |
|---|---|---|---|
| 4,989,895 | 2/1991 | Pearson et al. | 280/731 |
| 5,064,218 | 11/1991 | Hartmeyer | 280/731 |
| 5,259,641 | 11/1993 | Schenk et al. | 280/731 |
| 5,346,248 | 9/1994 | Rhein et al. | 280/732 |
| 5,562,301 | 10/1996 | Lutz | 280/728.2 |

FOREIGN PATENT DOCUMENTS

| | | | |
|---|---|---|---|
| 3182855 | 8/1991 | Japan . | |
| 2257400 | 1/1993 | United Kingdom | 280/728.2 |

Primary Examiner—Paul N. Dickson
Attorney, Agent, or Firm—Taylor J. Ross; Gerald K. White

[57] ABSTRACT

An airbag module combining assembly and mounting components and steps. The module includes an inflator having a mounting flange. The cushion mouth rests upon a top side of the flange. A rigid retaining member rests above the cushion mouth to secure the cushion to the flange. The retaining member includes studs which extend through mating holes in the cushion and flange. The free ends of the studs extend beyond the bottom of the flange. A cover fits over the folded cushion and includes a plurality of flaps extending downward. The ends of the flaps are folded under the flange and fit over the studs. Temporary restraints, such a friction lock washers are secured over the studs to secure the cushion, inflator and cover flaps between the retaining member and temporary restraints. The partially assembled module may be shipped in this condition. The extending free ends of the studs may then be inserted into mounting brackets in the vehicle, and permanent nuts fixed thereon. This firmly secures the cushion and cover to the inflator, and completes assembly of the module with the mounting step. This design further permits the use of a simplified cover flap which is easier to produce.

20 Claims, 2 Drawing Sheets

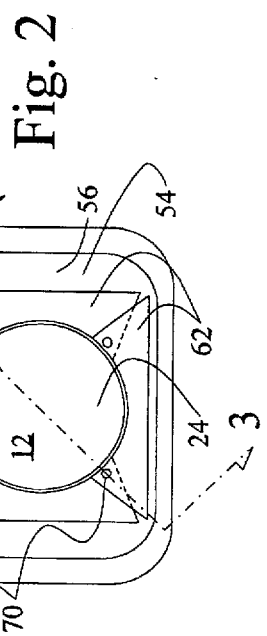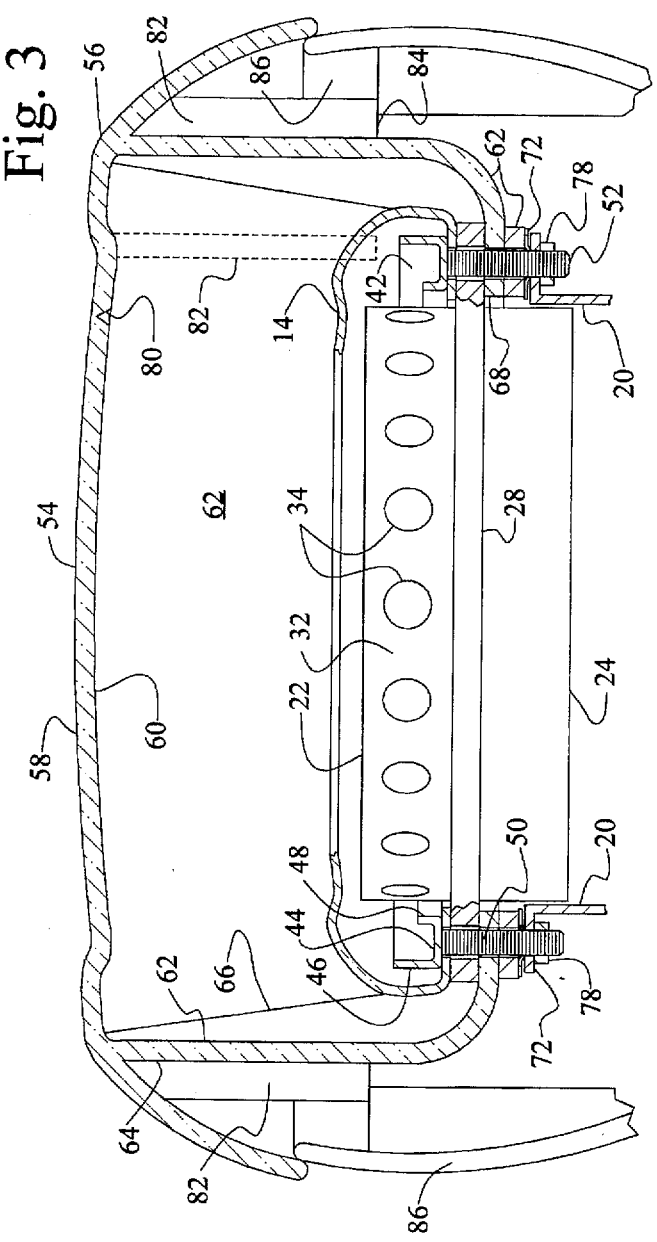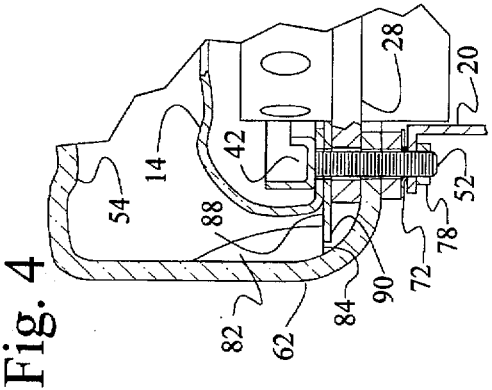

AIR BAG MODULE WITH COMBINED ASSEMBLY AND MOUNTING HARDWARE

BACKGROUND OF THE INVENTION

1. Field of the Invention

The present invention relates in general to air bag passive restraint modules and their mounting to vehicles. In particular, the present invention relates to an improved air bag module having hardware and steps to assemble the module combined with, and used for, mounting of the module to the vehicle.

2. Description of the Related Art

Air bag passive restraint systems are increasingly common in contemporary vehicles. Such systems typically include an inflator for producing a quantity of inflation gas upon receipt of a signal indicating a collision. The inflator is connected to a cushion in the form of a flexible fabric bag. The inflation gas inflates the cushion to a predetermined pressure. To protect the cushion during the (possibly years-long) period before the cushion is deployed, and to improve aesthetics in the vehicle passenger cabin, a cover is mounted over the cushion. Depending upon the design, a housing may also surround a portion of the inflator and cushion, with the housing and cover working together to protect the interior components. These items, when assembled together, are typically referred to as a module.

It has been a standard practice to assemble modules from their respective components, and to then mount the assembled module to the vehicle. While this has been effective, there is a constant effort to reduce the cost of air bag systems. This effort at cost reduction typically focuses on two areas; reducing the amount of material used to make a module, and reducing the mount of time to assemble and mount the module.

SUMMARY OF THE INVENTION

An object of the present invention is to provide an air bag module which provides a safe and reliable passive restraint for the passenger.

Another object of the present invention is to provide such a module, and a method of making and mounting such a module, which reduces the material, assembly and mounting costs for the module.

Yet another object of the present invention is to provide such a module which combines assembly and mounting components or hardware, and also combines assembly and mounting steps.

A further object of the present invention is to provide such a module in which the elements which secure the module components together are also used to secure the module to the vehicle, and wherein the steps to secure the module to the vehicle complete the assembly of the module.

Another object of the present invention is to provide a cover for such a module which includes simplified mounting flaps permitting easier manufacture.

Yet another object of the present invention is to provide a cover for such a module which provides positioning aids for improved final appearance.

These and other objects are achieved by an airbag module combining assembly and mounting components and steps. The module includes an inflator having a mounting flange. The cushion mouth rests upon a top side of the flange. A rigid retaining member rests above the cushion mouth to secure the cushion to the flange. The retaining member includes studs which extend through mating holes in the cushion and flange. The free ends of the studs extend beyond the bottom of the flange. A cover fits over the folded cushion and includes a plurality of flaps extending downward. The ends of the flaps are folded under the flange and fit over the studs. Temporary restraints, such a friction lock washers are secured over the studs to secure the cushion, inflator and cover flaps between the retaining member and temporary restraints. The partially assembled module may be shipped in this condition. The extending free ends of the studs may then be inserted into mounting brackets in the vehicle, and permanent nuts fixed thereon. This firmly secures the cushion and cover to the inflator, and completes assembly of the module with the mounting step. This design further permits the use of a simplified cover flap which is easier to produce.

BRIEF DESCRIPTION OF THE DRAWINGS

The objects and features of the invention noted above are explained in more detail with reference to the drawings, in which like reference numerals denote like elements, and in which:

FIG. 2 is a bottom view of the assembled module of FIG. 1, prior to mounting to the vehicle;

FIG. 3 is a cross-sectional side view of the module along line 3—3 of FIG. 2; and FIG. 4 is a detail cross-sectional side view showing a second embodiment of the present invention.

DETAILED DESCRIPTION OF THE INVENTION

Figure 1:
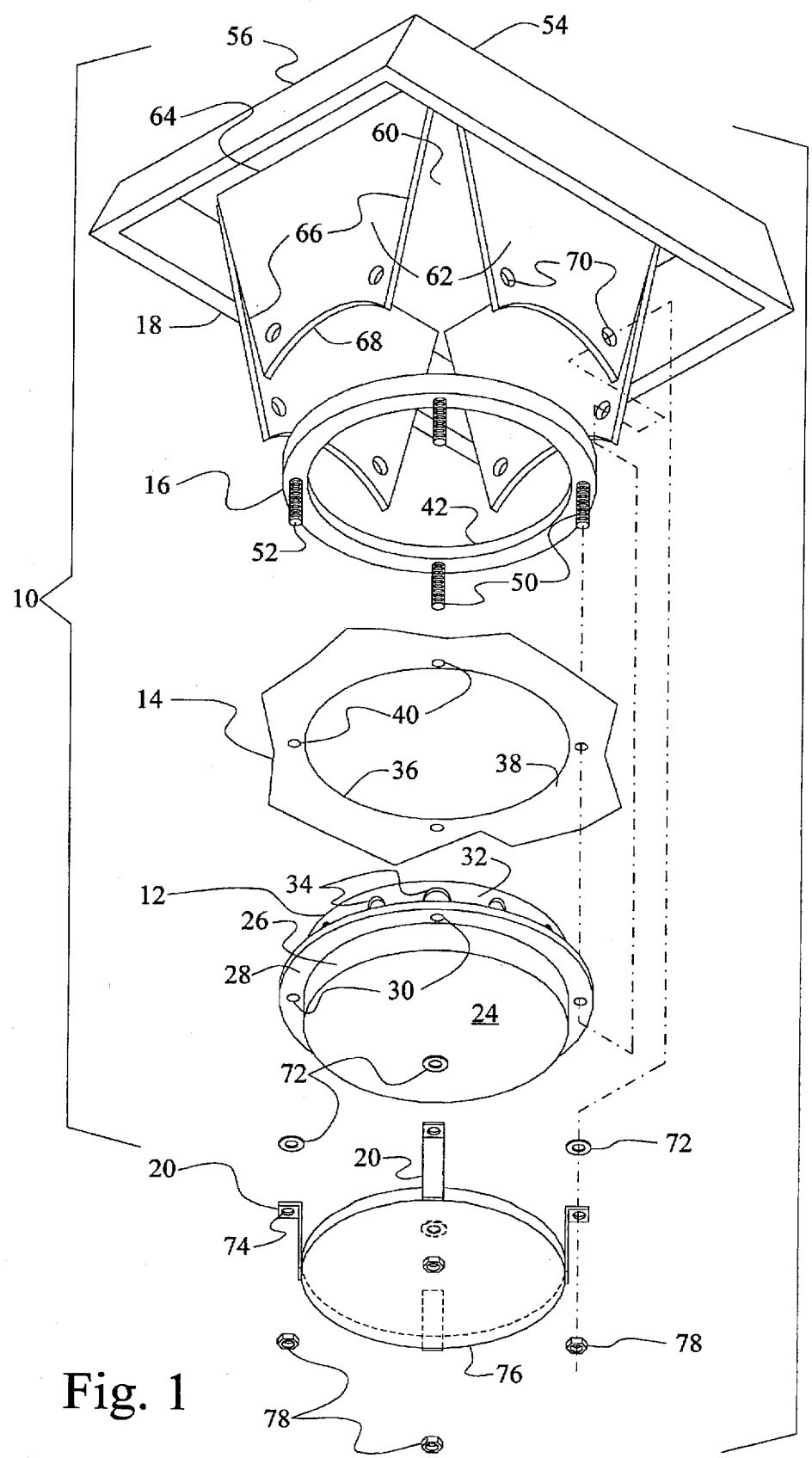
FIG. 1 is an exploded perspective view of a module according to the present invention and vehicle mounting points to which it is mounted.

With reference to FIG. 1, a module according to the present invention is generally designated by reference numeral 10. In the embodiment shown, the module is of a type typically associated with a driver side placement, for mounting to a steering wheel (not shown) of a vehicle. While the description will be made with reference to this embodiment, those skilled in the art will readily recognize the possible application to modules typically mounted in other locations.

The module 10 is formed of several major components, which include an inflator 12, a cushion 14, a retaining member 16, and a cover 18. These module components, after partial assembly described below, will be secured to appropriate mounting brackets 20 of the vehicle. The details of these components will now be described.

In the embodiment shown, the inflator 12 is of the type commonly used for driver side placement, and in particular, the type commonly mounted within the central section of the steering wheel. The inflator 12 has the general shape of a disk, with the longitudinal axis being pointed generally toward the driver when installed in the vehicle. In keeping with the general disk shape, the inflator 12 includes an outer housing which includes a circular top wall 22, a circular bottom wall 24 spaced from the top wall, and a tubular side wall 26 extending between the peripheries of the top and bottom walls. Intermediate the top and bottom walls, a peripheral inflator flange 28 extends radially outward from the side wall 26. The flange 28 includes a plurality of angularly spaced flange holes 30 extending therethrough.

While not shown, the inflator will include a mass of gas generant material which will produce a quantity of inflation gas upon being subject to an initiating high temperature, as well as an appropriate element, typically referred to as a squib, for producing the high temperature. The squib will in turn be electrically connected to a collision sensor in order to receive its activation signal. The inflation gas produced within the inflator housing will exit from a diffuser 32, formed by the section of the housing above the flange 28. As shown, the diffuser includes a plurality of gas exit ports 34, through which the gas will flow, angularly spaced about the side wall 26 of diffuser 32. Alternatively, the exit ports could be located in the top wall 22.

The gas from the inflator is of course used to inflate the cushion 14. The cushion is formed of flexible fabric, and includes an inlet opening 36 sized to receive the diffuser 32. Immediately surrounding the inlet opening there is an inlet peripheral edge 38.

Because the gas from the inflator must inflate the cushion in a very rapid manner, the inlet peripheral edge is subjected to relatively large forces, as made clear below, and as such may be reinforced by additional layers of fabric or other means. As best shown in FIG. 3, the inlet peripheral edge rests upon the upper face of the inflator flange 28. The inlet peripheral edge 38 includes a plurality of angularly spaced cushion holes 40 extending therethrough, with the cushion holes 40 being aligned with the flange holes 30.

The retaining member 16 is located within the cushion, just inside the inlet opening 36, as best shown in FIG. 3. With reference to FIG. 1, the retaining member includes a presser portion 42 having a shape corresponding to, and a size slightly larger than, the inlet opening 36. As such, the presser portion corresponds to and rests upon, the peripheral edge 38 of the opening. As is best shown in FIG. 3, this results in the peripheral edge 38 being held between the presser portion 42 and the inflator flange 28. As will be made clear below, the presser portion and flange will clamp the peripheral edge 38 to retain the edge in position during storage and deployment of the cushion.

To provide adequate clamping force, it is preferred that the presser portion be formed as a closed polygon. In the driver side embodiment shown, the presser portion is thus formed as a ring. To make the presser portion even more rigid, it is preferred that it be formed of metal which has been stamped, forged and/or drawn to have a U-shaped cross-section. This is best shown in FIG. 3, where the presser portion 42 is shown to include a lower crossbar 44, an outer leg 46 and an inner leg 48.

The retaining member 16 also has a plurality of angularly spaced studs 50 extending downward (i.e., in a direction opposite the legs 46 and 48) from the crossbar 44 to free ends 52. The spacing and number of studs 50 corresponds to the spacing and number of flange holes 30 and cushion holes 40. The studs 50 are threaded at least adjacent their free ends, for reasons discussed below.

The module 10 also includes the cover 18. The cover will include a generally planar front face 54 having a peripheral edge 56. For the driver side embodiment shown, the front face would, when finally assembled, be located in the center of the steering wheel. For a passenger side placement, the front face would typically form a section of the vehicle dashboard. The front face 54 further includes an upper surface 58, which will face the driver, and a lower surface 60. A plurality of cover flaps 62 extend downward from the lower surface 60.

The cover flaps are each flexible planar members having upper edges 64 secured to the lower surface 60, side edges 66 and a free edge 68. The flaps may advantageously be formed monolithically with the front face 54, as by a plastic molding operation. The upper edges of the flaps are located in proximity to the peripheral edge 56 of the front face, with the side edges of adjacent flaps in proximity to define a partial wall surrounding and aligned with the longitudinal axis, as best shown in FIG. 1. The area enclosed by this wall has a size and shape to receive the folded cushion 14 and a portion of the inflator 12. It is preferred that the side edges 66 be in close proximity to make the defined wall as complete as possible, for reasons made clear below. In the embodiment shown, there are four flaps 62, with adjacent flaps arranged perpendicular to each other, such that the defined wall is square in cross-section. Other numbers of flaps, and wall cross-sections are of course possible. All that is strictly required is that the defined wall be capable of encompassing the cushion and portion of the inflator.

Each of the flaps 62 includes at least one flap hole 70 adjacent its free edge 64. As noted above, each of the flaps is flexible, and as such, the flaps may be bent inward to align the flap holes with the cushion and inflator holes. In the embodiment shown, the inflator sidewall 26 extends outward between a straight line intersecting the flange holes 30, and as such the free edges 68 of the flaps used with such an inflator are formed in a section of a circle having a diameter slightly greater than that of the inflator sidewall. This permits alignment of the flap holes without interference with the sidewall.

With all major components of the module 10 thus described, the assembly configuration and steps will now be described.

To begin, the retaining member 16 is inserted into the inlet opening 36 of the cushion, and the studs 50 of the retaining member are inserted through the cushion holes 40. If not already done, the remaining portion of the cushion (i.e., that portion beyond the peripheral edge 38) is then folded to form a bundle resting on top of the retaining member, with the studs 50 extending downward from the folded cushion, and the inlet opening accessible. To retain the cushion in it fully folded condition, one or more straps (not shown) formed of weakened material could be passed over the folded cushion and have their free ends secured to a pair of the studs 50, such as by inserting the studs through appropriate holes in the strap ends. The free ends 52 of the studs 50 extend beyond the cushion and any such strap when completed.

Thereafter, the studs 50 are inserted into the flange holes 30 of the inflator. The inflator is moved upward relative to the cushion and retaining member to clamp the peripheral edge 38 of the cushion between the retaining member 16 and the inflator flange 28. In the embodiment shown, this also serves to insert the diffuser 32 into the inlet opening of the cushion. The studs 50 have sufficient length that their free ends will also extend beyond the inflator flange after this operation is complete.

The cover 18 is then moved over the cushion and inflator, such that the wall defined by the flaps 62 surrounds the periphery of the folded cushion and inflator. The flaps are then folded inward, and the flap holes 70 are passed over the free ends 52 of the studs 50. In the embodiment shown, and as best illustrated in FIG. 2, each of the four flaps is provided with two flap holes. As such, each of the studs will receive a flap hole from two adjacent ones of the flaps 62, as best illustrated in FIG. 3. Upon completion of this step, it may be seen that the folded cushion is surrounded and protected by the cover front face 54 and the flaps 62. This protection is best when there is a relatively small spacing between the side edges 66 of the flaps, but adequate protection is provided with even a moderate amount of space between these side edges.

The final step in the partial assembly is to place a temporary restraint 72 over the free ends of each of the studs 50. The temporary restraint may take several forms, but must provide a sufficient force to retain the flaps to the studs during shipping and the remaining assembly steps. Suitable restraints include friction locking washers, such as shown, which include a central hole having a diameter slightly smaller than that of the stud 50, and sufficient resilience to pass over the stud without damaging any threads on the stud. Such resilience may be enhanced by forming a pucker about the hole in the washer, as shown. Such a washer may be formed of metal or plastic, just so long as sufficient retaining force is provided. Other restraints may be used, and are known in the art.

Since a variety of items may be used for the temporary restraints, they may alternatively be referred to as temporary restraint means. It is preferable that the restraint be capable of installation with simple pressing (as opposed to a turning operation required for a nut) to reduce partial assembly cost. Additionally, while individual restraints are shown, the restraints could be connected together by appropriate connecting webs (not shown).

After mounting of the temporary restraints 72, the module is secured in its assembled condition in a manner sufficient for storage, shipping and final assembly. In other words, during the relatively low forces applied during such operations, the flaps will be retained on the studs, and the studs (and thus the retaining member 16) will remain in position to hold the module components together. While this partial assembly is sufficient for these operations, it is not sufficient for deployment of the air bag. In particular, the large forces generated to inflate the cushion would force the cushion away from the inflator, stripping the studs from the flaps and inflator.

As such, final assembly is required. This final assembly is combined with the mounting of the module to the vehicle. As noted, the vehicle will include appropriate mounting brackets 20 to mount the module 10. In the embodiment shown, the brackets 20 are secured to a steering wheel armature 76, although other placements will of course provide other support for the brackets. These brackets 20 will include bracket holes 74 in mating position with the studs 50.

To complete the assembly, and simultaneously mount the inflator, the partially assembled module is placed into position such that the free ends of the studs pass through the bracket holes 74. During this procedure the temporary restraints 72 remain in position, to secure the flaps in position during this procedure, and to eliminate the cost of removing the restraints. Again, the studs are sufficiently long that the free ends will extend beyond the bracket holes. Thereafter, appropriate nuts 78 are threaded upon the free ends 52, and tightened.

This tightening of the nuts 78 may be seen to secure the module to the vehicle. Additionally, however, this tightening also serves to fully clamp the cushion, inflator and flaps between the retaining member 16 and the brackets 20. As such, this operation not only mounts the module, but also completes its assembly. This of course reduces the prior art costs of providing, and tightening, a first set of studs to assemble the inflator, and then providing, and tightening, a second set of studs to mount the module to the vehicle. With this invention, the redundant steps are eliminated, saving material, manufacturing and assembly costs.

The present arrangement not only provides a secure clamping of the cushion peripheral edge to ensure that the cushion is not blown from the inflator during deployment, but also securely retains the cover in position. This is of course important to provide the cushion protective function of the cover. However, this is also important during deployment. As may be seen, the encapsulation of the cushion within the cover would prevent the inflation of the cushion to protect the passenger. To permit this inflation, the front face is provided with a line of weakness 80 (FIG. 3), such as perforations, or a reduced thickness as shown.

This line of weakness will break when subjected to the force of the inflating cushion, permitting the cushion to pass through the front face of the cover and fully inflate. Prior to breaking the line 80, however, appreciable forces are generated which would tend to propel the cover toward the passenger, causing injury. It is therefore important that the cover be securely retained, as provided by the simple arrangement of the present invention.

Moreover, it has been found that the retention of the cover, and specifically the flaps, in the inventive arrangement is sufficiently strong to permit an advantageous modification of the flaps. Specifically, in prior art covers the flaps (while held in different location compared to the present invention) were provided with areas of increase thickness adjacent their free ends, referred to herein as end blocks. During assembly these blocks were located within mating recesses. As such, these blocks would provide laterally extending, upwardly facing, shoulders. These shoulders, upon mounting of the flaps in the module, would abut against other module components, to thus secure the flaps against pulling out of their assembled position.

While this arrangement was serviceable (and could still be used with the present invention), the production of these covers was difficult. Specifically, it is most cost-effective to mold the cover and flaps as a single monolithic unit. Forming the blocks, however, required molds having undercut portions to produce the upward facing shoulders. The blocks formed on the flaps would then resist removal from the mold in a manner similar to their intended function in the module. Molding these covers was therefore time consuming, and often resulted in a large percentage of covers rejected due to damage caused in attempting to free the cover from the mold.

In the present invention, however, the retention of the flaps is sufficiently strong that no end blocks are required on the flaps. As shown, the flaps may be formed as essentially planar elements, having a substantially constant thickness, greatly improving the ease of production, and again reducing material and production costs. Assembly cost may also be reduced as there is no need to ensure that the end blocks are properly seated in their recesses.

The cover of the present invention may also be provided with additional elements to aid in positioning. For example, as shown in FIG. 3, the peripherally exterior face of the flaps may be provided with raised strips 82 having lower ends which form positioning shoulders 84. In contrast the end blocks noted above, the strips 82 would preferably have only the downward facing shoulder, and would preferably not include an upward facing shoulder. As such, production of the cover with the strips would not reduce the ease of manufacture.

During assembly the positioning shoulder may abut against a rear steering wheel cowling 86 (or portion of a dashboard for a passenger side mounting). As the module 10 is tightened in place for mounting, the rear cowling will maintain the position of the front face of the cover, with flexing of the flaps permitting any movement of the other module components toward mounting brackets 20, which may be required to fully assemble and mount the module. Alternatively, the module may be assembled and mounted, and the positioning shoulders may then be used to properly position the rear cowling 86 during its installation.

The use of raised strips forming positioning shoulders is not limited to positioning relative to components outside the module. In particular, the embodiment of FIG. 4 shows an arrangement where the positioning shoulder is used to properly position the front face of the cover.

In this embodiment there is provided a flat reaction plate 88 between the retention member 16 and the flaps 62. The reaction plate is relatively rigid, and may be formed of metal or a strong plastic. The reaction plate includes an outer peripheral edge portion 90 which extends outward beyond the cushion 14. The flaps 62 of this embodiment are provided with the raised strips 82, this time formed on the peripherally interior face. The positioning shoulder of the strip may thus rest upon the outer peripheral portion of the reaction plate. This abutment will thus properly position the flaps, and thus the front face of the cover, with respect to the reaction plate. Since the reaction plate is clamped with the inflator flange and other components, the front face is thus reliably and properly positioned with respect to the brackets 20 upon final assembly. The front face may thus form part of a flush surface without the need for laborious and time consuming manual positioning.

It is noted that the reaction plate need only be located above the folded-over portions of the flaps to provide this positioning. As such, the reaction plate could be located below the inflator flange, and the flaps below the reaction plate, and this feature would still perform properly. Alternatively, the reaction plate could be located as shown in FIG. 4, but the flaps could be located between the reaction plate and the inflator flange (i.e., above the inflator flange). Such a positioning of the flaps above the flange is also possible with the first embodiment of FIGS. 1–3.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An air bag module combining assembly and mounting hardware adapted to be mounted in a vehicle, comprising:
    a cushion having an inlet opening and a peripheral edge surrounding said opening, said peripheral edge having a plurality of cushion holes extending therethrough;
    an inflator having a peripheral flange and a diffuser positioned to direct an inflation gas through said inlet opening upon deployment, said flange having a plurality of flange holes aligned with said cushion holes;
    a cover having a front face and a plurality of flaps extending downward from said front face, said flaps being located about a periphery of said flange and having free ends bent peripherally inward, said free ends having flap holes aligned with said cushion and flange holes;
    a retaining member having a plurality of studs extending downward therefrom, each of said studs extending through a set of aligned ones of said cushion, flange and flap holes, said studs having free ends extending beyond said holes; and
    a temporary restraint received upon each of said studs with said free ends of said studs extending beyond said restraints, said restraints and said retaining member together clamping said cushion peripheral edge, said inflator flange and said flap free ends with sufficient strength to retain said edge, flange and flaps together prior to mounting in the vehicle, but alone having insufficient strength to retain said edge, flange and flaps together during deployment.

2. A module as in claim 1, wherein said retaining member includes a presser portion in the form of a closed polygon corresponding to said inlet peripheral edge, said studs extending from said presser portion.

3. A module as in claim 2, wherein said cushion peripheral edge is intermediate said presser portion and said flange.

4. A module as in claim 3, wherein said free ends of said flaps are intermediate said flange and said temporary restraints.

5. A module as in claim 4, wherein said temporary restraints are secured to said studs by friction.

6. A module as in claim 1, wherein said flaps are free of laterally extending shoulders.

7. A module as in claim 1, wherein at least one of said flaps include at least one raised strip extending downward, said strip defining a positioning shoulder at its lower edge.

8. A module as in claim 7, wherein said raised strip is formed on a peripherally outer face of said flap.

9. A module as in claim 7, wherein said raised strip is formed on a peripherally inner face of said flap, and further including a reaction plate mounted above said free ends of said flaps, said positioning shoulder abutting against an upper face of said reaction plate.

10. A module as in claim 1, in combination with a vehicle, wherein:
    said vehicle includes a bracket having a plurality of bracket holes aligned with said cushion, flange and flap holes, said studs being received through said bracket holes with said free ends of said studs extending beyond said bracket holes; and
    further including a nut threaded upon each of said free ends of said studs, said nuts and said retaining member clamping said cushion, inflator flange, flaps and bracket therebetween with sufficient strength to retain said edge, flange and flaps together during deployment.

11. A module as in claim 1, wherein the number of said studs equals the number of said flaps, and wherein each of said flaps includes two of said flap holes, and wherein each of said studs receives thereon a flap hole from two adjacent ones of said flaps.

12. A module as in claim 11, wherein there are four of said flaps, arranged with side edges of adjacent ones of said flaps in close proximity.

13. A module as in claim 12, wherein said retaining member includes a presser portion in the form of a closed polygon corresponding to said inlet peripheral edge, said studs extending from said presser portion.

14. A module as in claim 13, further including a presser plate, located intermediate said presser portion and said flaps, and wherein at least one of said flaps includes a raised strip on a peripherally inner face of said flap, said strip defining a positioning shoulder at its lower edge, said positioning shoulder abutting against an upper face of said reaction plate.

15. An air bag module combining assembly and mounting hardware adapted to be mounted in a vehicle, comprising:

a cushion having an inlet opening and a peripheral edge surrounding said opening, said peripheral edge having a plurality of cushion holes extending therethrough;

an inflator having a peripheral flange and a diffuser positioned to direct an inflation gas through said inlet opening upon deployment, said flange having a plurality of flange holes aligned with said cushion holes;

a cover having a front face and a plurality of flaps extending downward from said front face, said flaps being located about a periphery of said flange and having free ends bent peripherally inward, said free ends having flap holes aligned with said cushion and flange holes;

a retaining member having a plurality of studs extending downward therefrom, each of said studs extending through a set of aligned ones of said cushion, flange and flap holes, said studs having free ends extending beyond said holes; and temporary restraint means upon each of said studs with said free ends of said studs extending beyond said restraints, said means and said retaining member together clamping said cushion peripheral edge, said inflator flange and said flap free ends with sufficient strength to retain said edge, flange and flaps together prior to mounting in the vehicle, but alone having insufficient strength to retain said edge, flange and flaps together during deployment.

16. A module as in claim 15, wherein said retaining member includes a presser portion in the form of a closed polygon corresponding to said inlet peripheral edge, said studs extending from said presser portion.

17. A module as in claim 16, wherein said cushion peripheral edge is intermediate said presser portion and said flange.

18. A module as in claim 17, wherein said free ends of said flaps are intermediate said flange and said temporary restraint means.

19. A module as in claim 15, wherein at least one of said flaps include at least one raised strip extending downward, said strip defining a positioning shoulder at its lower edge.

20. A module as in claim 15, in combination with a vehicle, wherein:

said vehicle includes a bracket having a plurality of bracket holes aligned with said cushion, flange and flap holes, said studs being received through said bracket holes with said free ends of said studs extending beyond said bracket holes; and further including a nut threaded upon each of said free ends of said studs, said nuts and said retaining member clamping said cushion, inflator flange, flaps and bracket therebetween with sufficient strength to retain said edge, flange and flaps together during deployment.

\* \* \* \* \*